(12) United States Patent
Shay et al.

(10) Patent No.: US 12,117,988 B2
(45) Date of Patent: Oct. 15, 2024

(54) TECHNIQUES FOR DISTRIBUTED LOCKS

(71) Applicant: GONG.io Ltd., Ramat Gan (IL)

(72) Inventors: Zohar Shay, Even Yehuda (IL); Golan Levy, Ramat Gan (IL)

(73) Assignee: GONG.io Ltd., Ramat Gan (IL)

( * ) Notice: Subject to any disclaimer, the term of this patent is extended or adjusted under 35 U.S.C. 154(b) by 87 days.

(21) Appl. No.: 17/814,649

(22) Filed: Jul. 25, 2022

(65) Prior Publication Data

US 2024/0028579 A1  Jan. 25, 2024

(51) Int. Cl.
G06F 16/00 (2019.01)
G06F 16/23 (2019.01)

(52) U.S. Cl.
CPC .................. *G06F 16/2343* (2019.01)

(58) Field of Classification Search
CPC .................................................. G06F 16/2343
See application file for complete search history.

(56) References Cited

U.S. PATENT DOCUMENTS

| 8,286,182 | B2 | 10/2012 | Chan | |
|---|---|---|---|---|
| 2003/0065681 | A1* | 4/2003 | Houston | G06F 16/27 |
| 2008/0168458 | A1* | 7/2008 | Fachan | G06F 9/526 |
| | | | | 718/104 |
| 2010/0023521 | A1* | 1/2010 | Arcese | G06F 16/2343 |
| | | | | 707/E17.007 |
| 2011/0137879 | A1* | 6/2011 | Dubey | G06F 16/1774 |
| | | | | 707/704 |
| 2012/0102493 | A1* | 4/2012 | Allen | G06F 9/4881 |
| | | | | 718/107 |
| 2013/0066837 | A1* | 3/2013 | Colrain | G06F 16/2365 |
| | | | | 707/674 |
| 2014/0040885 | A1* | 2/2014 | Donahue | G06F 9/45558 |
| | | | | 718/1 |
| 2016/0162537 | A1 | 6/2016 | Mitchell et al. | |
| 2017/0242769 | A1* | 8/2017 | Sherlock | G06F 11/2092 |
| 2018/0129693 | A1* | 5/2018 | Chatterjee | G06F 16/2329 |
| 2019/0018865 | A1 | 1/2019 | Ivanov et al. | |
| 2021/0049049 | A1* | 2/2021 | Kuik | G06F 9/5033 |

(Continued)

OTHER PUBLICATIONS

Oracle. "Lock". https://docs.oracle.com/javase/8/docs/api/java/util/concurrent/locks/ReentrantLock.html#lock--, 2022.

(Continued)

*Primary Examiner* — Syed H Hasan
(74) *Attorney, Agent, or Firm* — M&B IP Analysts, LLC

(57) ABSTRACT

A method and system for executing distributed locks in a locking system is disclosed. The system includes receiving a lock request including at least a lock name of a resource to place a lock on; determining a shard key at least based on the lock name and a prefix value, wherein the locking system includes a set of database instances, and wherein the prefix value is a number of database instances in the locking system; sending the lock request to at least two database instances in the set of database instances to place the lock in an entry pointed by the shard key; acknowledging the lock request when all of the at least two database instances acknowledge the lock request; and dismissing the lock request when at least one database instance of the at least two database instances cannot acknowledge the lock request.

21 Claims, 7 Drawing Sheets

(56) References Cited

U.S. PATENT DOCUMENTS

2021/0382636 A1* 12/2021 Perumal ............... G06F 3/0622

OTHER PUBLICATIONS

Oracle. "Try Lock Long JAVA". https://docs.oracle.com/javase/8/docs/api/java/util/concurrent/locks/ReentrantLock.html#tryLock-long-java.util.concurrent.TimeUnit-, 2022.
Oracle. "Try Lock". https://docs.oracle.com/javase/8/docs/api/java/util/concurrent/locks/ReentrantLock.html#tryLock-, 2022.
Oracle. "Using DBMS_LOCK". https://docs.oracle.com/database/121/ARPLS/d_lock.htm#ARPLS66761, 2016.
PostgreSQL. "Sep. 26, 2010. Advisory Lock Functions". https://www.postgresql.org/docs/11/functions-admin.html#FUNCTIONS-ADVISORY-LOCKS, 2022.
Scott Leberknight. "Distributed Lock using Zookeeper". https://dzone.com/articles/distributed-lock-using, 2022.
Zookeeper. "Locks". https://zookeeper.apache.org/doc/current/recipes.html#sc_recipes_Locks, 2022.

* cited by examiner

TECHNIQUES FOR DISTRIBUTED LOCKS

TECHNICAL FIELD

The present disclosure generally relates to distributed computing environments, and specifically techniques for implementing distributed locks in such computing environments.

BACKGROUND

In distributed computing environments, multiple processes are typically run concurrently and access the same resource substantially at the same time. That is, multiple processes need to modify or read data in a database and possibly conflict with one another. In distributed computing environments, such processes run on separate machines makes language level, or even file system level, synchronization a complex task.

In computing art, such problems are solved using locks. A lock or mutex (from mutual exclusion) is a synchronization primitive, i.e., a mechanism that enforces limits on access to a resource when there are many threads of execution. A lock is designed to enforce a mutual exclusion concurrency control policy, with a variety of possible methods, and multiple, unique implementations exist for different applications.

To implement locks in a distributed computing environment, a distributed locking system is used. Such system typically manages coordination across a cluster of machines (e.g., virtual machines), and further manages information as a hierarchical system of "nodes" (much like a file system). Each node can contain data or child nodes. The distributed locking system, such as Zookeeper, can support different types of locks (e.g., persistent and sequential) and can scale-in, or scale-out on demand. Further, such a system preserves locks semantics across nodes upon failure and restart.

However, a significant disadvantage of distributed locking systems, such as Zookeeper, is the lack of machines to detect, trace, and/or recover lock contention issues. As a prime example, a distributed locking system does not provide visibility into deadlocks. A deadlock is any situation in which no process can proceed because such a process waits for another process, including itself, to take action, such as releasing a lock. Deadlocks are common problems in distributed systems, as they use software or hardware locks to arbitrate shared resources and implement process synchronization.

Other solutions that support locks include relational databases, such as PostgreSQL. A locking service in such databases ensures atomic operations and are used to synchronize scheduled task execution, while providing lock fairness (first-come, first-served) and visibility into locks. However, relational databases locking services are not scalable and poorly performed in distributed computing environments. Further, such services do not preserve locks semantics upon database failure or restart.

It would therefore be advantageous to provide a distributed locking solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for executing distributed locks in a locking system, comprising: receiving a lock request including at least a lock name of a resource to place a lock on; determining a shard key at least based on the lock name and a prefix value, wherein the locking system includes a set of database instances, and wherein the prefix value is a number of database instances in the locking system; sending the lock request to at least two database instances in the set of database instances to place the lock in an entry pointed by the shard key; acknowledging the lock request when all of the at least two database instances acknowledge the lock request; and dismissing the lock request when at least one database instance of the at least two database instances cannot acknowledge the lock request.

Certain embodiments disclosed herein include a controller for executing distributed locks in a locking system, comprising: a processing circuitry; and a memory, the memory containing instructions that, when executed by the processing circuitry, configure the controller to: receive a lock request including at least a lock name of a resource to place the lock on; determine a shard key at least based on the lock name and a prefix value, wherein the locking system includes a set of database instances, and wherein the prefix value is a number of database instances in the locking system; send the lock request to at least two database instances in the set of database instances to place the lock in an entry pointed by the shard key; acknowledge the lock request when all of the at least two database instances acknowledge the lock request; and dismiss the lock request when at least one database instance of the at least two database instances cannot acknowledge the lock request.

Certain embodiments disclosed herein include a method for executing method of scaling a distributed locking system, the distributed locking system includes a set of database instances, further comprising: determining a current prefix value for a current set of database instances, wherein a current set database instances includes at least two database instances; determining a new prefix value for a new set of database instances resulted from a scale operation on the current set of database instances; upon receiving a locking request, computing a first shard key based in part on the current prefix value, and a second shard key based in part on the new prefix value; and processing the lock request using the first shard key on the current set of database instances and using the second shard key on the new set of database instances.

Certain embodiments disclosed herein include a controller for executing distributed locks in a locking system, comprising: a processing circuitry; and a memory, the memory containing instructions that, when executed by the processing circuitry, configure the controller to: determine a current prefix value for a current set of database instances, wherein a current set database instances includes at least two database instances; determine a new prefix value for a new set of database instances resulted from a scale operation on the current set of database instances; upon receiving a locking request, compute a first shard key based in part on the current prefix value, and a second shard key based in part on the new prefix value; and process the lock request using the first shard key on the current set of database instances and using the second shard key on the new set of database instances.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
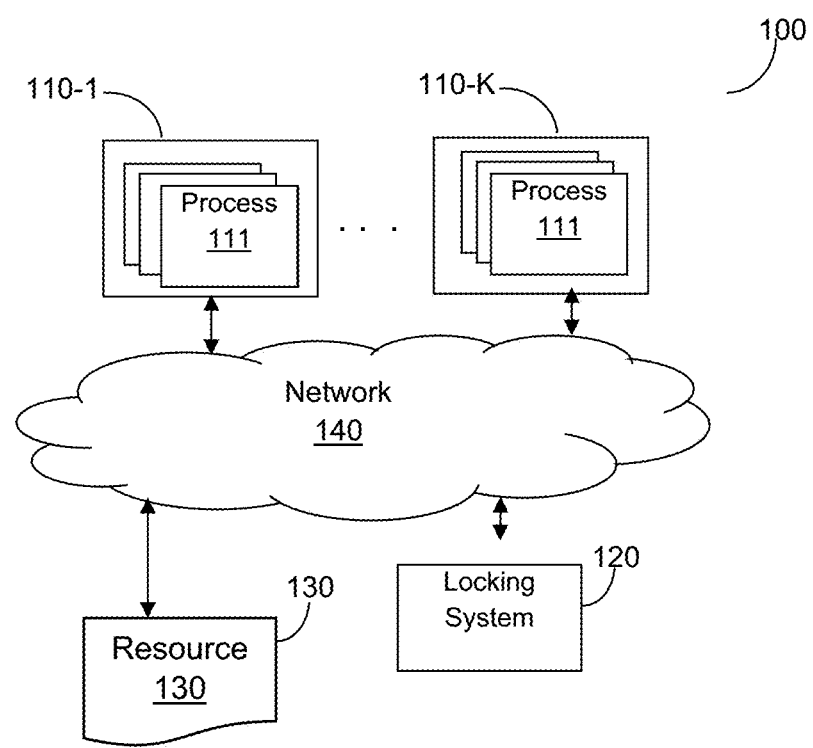
FIG. 1 is an example network diagram that describes the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, numerals refer to like parts through several views.

A system and method for managing distributed locks are provided as an example of the disclosed embodiments. The disclosed method implements two-phase commit protocol (2PC) over a set of share-nothing databases. A 2PC protocol is a distributed algorithm for coordinating all the processes that participate in an distributed atomic transaction on whether to commit or abort (roll back) the transaction. That is, the 2PC protocol provides atomic processing for a transaction processing paradigm across a distributed set of resources.

The disclosed locking system includes a set of share-nothing databases configured to only manage locks in a distributed computing environment, such as a cloud computing environment. In an embodiment, each database is an instance of a relational database, such as, but not limited to, PostgreSQL. Therefore, the locks are persistent and fully traceable. Furthermore, the locking system can be scaled on-demand, while ensuring a uniform contiguous namespace. Thus, the disclosed embodiments can support distributed locks in a distributed computing environment.

According to some embodiments, the disclosed locking system does not require locking on all pending transactions. In contrast to traditional databases with a row level or table level lock, a lock on a row or table can be held for a long time protecting some long running transactions. As such, the performance is negatively impacted (e.g., long wait time for running transaction). Here, the locks are registered in a dedicated system outside of the database on which transactions are processed, thus there is no need to hold the locks as long as the transactions are completed, thereby improving the overall performance of databases.

Further improvements provided by the disclosed embodiments allows for cashing already acquired locks at the client. Thus, if a lock is already acquired by a different thread in the same client, any subsequent lock requests for the same requests are not sent, while honoring the lock semantics of the already acquired lock. This eliminates the need to save additional connection requests to the locking system.

FIG. 1 shows an example network diagram 100 of a distributed computing environment utilized to describe the various disclosed embodiments. In the example network diagram 100, a plurality of servers 110-1 through 110-K (collectively referred to as a server 110 or servers 110), a locking system 120, and a computing resource 130 (or simply resource 130) are connected to a network 140.

The network 140 may be, but is not limited to, wireless, cellular, or wired network, a local area network (LAN), a wide area network (WAN), a metro area network (MAN), the Internet, the worldwide web (WWW), similar networks, and any combination thereof.

Each server 110 is configured to execute applications (e.g., web applications, cloud applications, and legacy applications, etc.), services, processes, and the like (collectively referred to as a process or processes (collectively labeled as "111")). A process 111 can read data from the resource 130, process data, and write data either to the resource 130 or other servers 110, the same server, or another resource (not shown). Each of the servers 110 may by a physical device or a virtual instance, such a virtual machine, a software container, and the like. The servers 110 may be deployed in a cloud computing platform and are typically geographically distributed.

The computing resource 130 may include any 'critical section' in the code, a file system, a storage, and the like. For example, such critical section may include a file, an object, a service, a process, a thread, and the like. Such resource 130 may be stored in a storage resource (e.g., database, data store, data lack, and the like); executed in a computing resource (e.g., a server) or a networking resource (e.g., firewall, load balance, etc.), and so on. The resource 130 may be virtual or physical and deployed in a cloud computing platform.

To demonstrate the requirements for locks, a server 110-1 reads a file (f1) (i.e., a resource 130), processes the file (f1), and writes the processed file back to a different processing server, e.g., server 110-2. During such a file processing, a server 110-2 attempts to read the file (f1) and process the same file (f1). If there is no lock on the file (f1), the server 110-2 can read that file. This may result in a critical issue if a copy of the file (f1) is currently being processed at server 110-1. For example, if the file (f1) includes a current bank account balance, a server 110-1 performs a deposit action, and a server 110-K a draw action. The draw action may not be authorized if processed before server 110-1 completes the deposit operation. This simple example emphasizes the need for locks, specifically in distributed environments where servers are geographically distributed, which adds to the processing latency. Further, many processes run concurrently in such environments, attempting to access a single resource.

However, setting locks is not enough. As such locks should be managed at least to maintain fairness, consistency, contention-free processes, and to support distributed servers. To this end, according to the disclosed embodiments, the locking system 120 is designed to provide distributed locks, while providing these features.

The locking system 120 is configured to preserve lock consistency upon failure or restart of the system 120. That is, no lock information is lost during such events. Further, the disclosed locking system 120 provides fairness based on a first-come, first-served basis. In an embodiment, the locking system 120 is designed with a native locking system to allow for deadlock detection and traceability of such locks. In yet another embodiment, the locking system 120 provides an application programming interface (API) compatible with existing locking commands, such as defined, for example, by Java® ReentrantLock. That is, the semantic and syntax of such API is provided in existing systems. This feature allows developers to simply implementation of the embodiments disclosed herein, in existing database systems and programs.

In order to efficiently support locks in the distributed computing environment, the locking system 120 is scalable. As demonstrated below, database instances holding the locks can be added or removed from the locking system 120. Thus, additional database clusters directly increase the number of supported locks and clients. An example block diagram of the locking system 120 is provided in FIG. 2.

Figure 2:
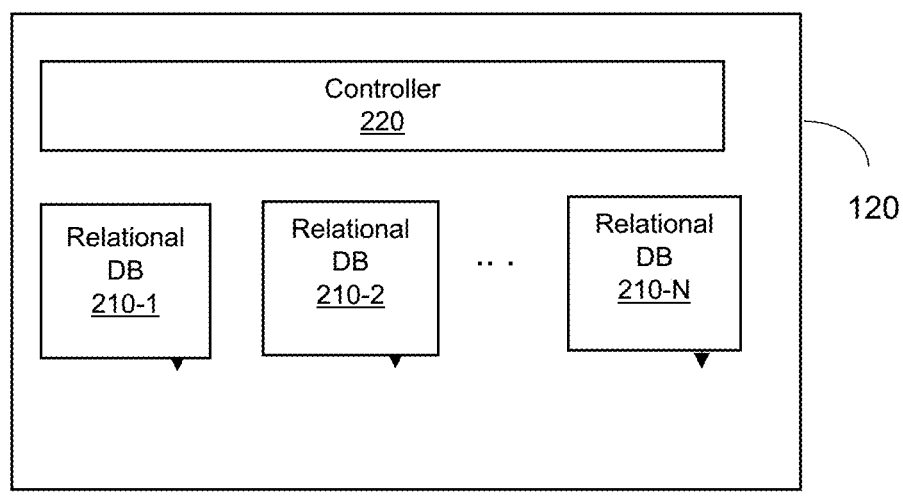
FIG. 2 is a block diagram of a locking system designed according to an embodiment.

Referring now to FIG. 2, which shows a block diagram of the locking system 120 designed according to an embodiment. The locking system 120 includes a set of database (DB) instances (or simply a database or databases) 210-1 through 210-N (where N is an integer greater than 1) and a controller 220. No information is shared between the databases 210. In an embodiment, each database 210 is a relational database, such as, but not limited to, PostgreSQL. According to this embodiment, all locks performed in the locking system 120 are supported by such a database 210.

Specifically, each relational database provides a means for creating locks with application-defined meanings. There are two ways to acquire a lock in a database 210: at a session level or a transaction level. According to the disclosed embodiments, session level locks are provided. Once acquired at a session level, the lock is held until it is explicitly released or until the session ends. Session-level lock requests do not honor transaction semantics. A lock can be acquired multiple times by its owning process; for each completed lock request, there is a corresponding unlock request before the lock is released. It should be appreciated that since the databases 210 are relational databases, the locking system 120 is configured to detect deadlocks using mechanisms inherently implemented by these databases. It should be further appreciated that the databases 210 are configured to manage locks only. As such, the databases 210 do not maintain any schema or handle database transactions, and each database can be realized as a lightweight instance which reduces the required computing resources for the operation of such databases.

According to the disclosed embodiments, each lock request is submitted by a server (e.g., a server 110, FIG. 1) and received at the controller 220. The controller 220 is configured to manage the locks in the system 120. To this end, a lock request includes at least the lock name of the critical section on which a lock is requested. The controller 220 is configured to compute a shard key based on the lock name (which may be a string value) in the request and a set prefix. The set prefix determines the number of databases 210 in the current set. As discussed below, the set prefix value is required during a scale-out or scale-in process.

The shard key is an index to an entry in a database 210, where the lock should be recorded. The shard key is computed in an embodiment using a hash function over the lock name and the set prefix value. It should be noted that a shard key is only one example for an index or pointer, and other implementations can be utilized as well. It should be further noted that the prefix value can be any value uniquely identifying a number of databases in the current set. That is, a shard key can be any index or point exclusively pointing to an entry in a database 210, where the entry holds a record of a lock, when acquired.

As the databases 210 share no information and operate independently, each lock request is checked against at least a pair of databases 210. For example, a lock request is sent to both database 210-1 and 210-2, and such request must be acquired by both databases 210-1 and 210-2. The acquisition of locks by the two databases 210-1 and 210-2 (all databases in a cluster) is performed using a two-phase commit protocol. That is, in this example, a lock request is granted only if the lock can be acquired by two databases 210-1, and 210-2 in the cluster. Acquiring locks using the two-phase commit protocol will be discussed below with reference to FIG. 3.

It should be appreciated that since the databases 210 are relational databases, the locking system 120 is configured to detect deadlocks using mechanisms implemented by these databases. The databases 210 can be geographically distributed. To ensure a lock consistency, a two-phase commit is implemented to ensure that any network latency between the databases 210 would not affect the lock consistency.

In an embodiment, the locking system 120 can scale-out (i.e., adding database instances) or scale-in (i.e., removing database instances). When the configuration of the locking system 120 changes due to the number of database instances, all locks stored therein should be maintained upon a scaling event. The scaling process is further explained in FIG. 4.

The controller 220 can be realized in software, hardware, firmware, middleware, or any combination thereof. In an embodiment, the controller 220 can be a device external to the locking system 120. An example block diagram of the controller 220 is provided in FIG. 7. In certain configurations, controller 220 can be implemented or embedded in a client (e.g., a server 110) requesting the locks from the system 120.

Figure 3:
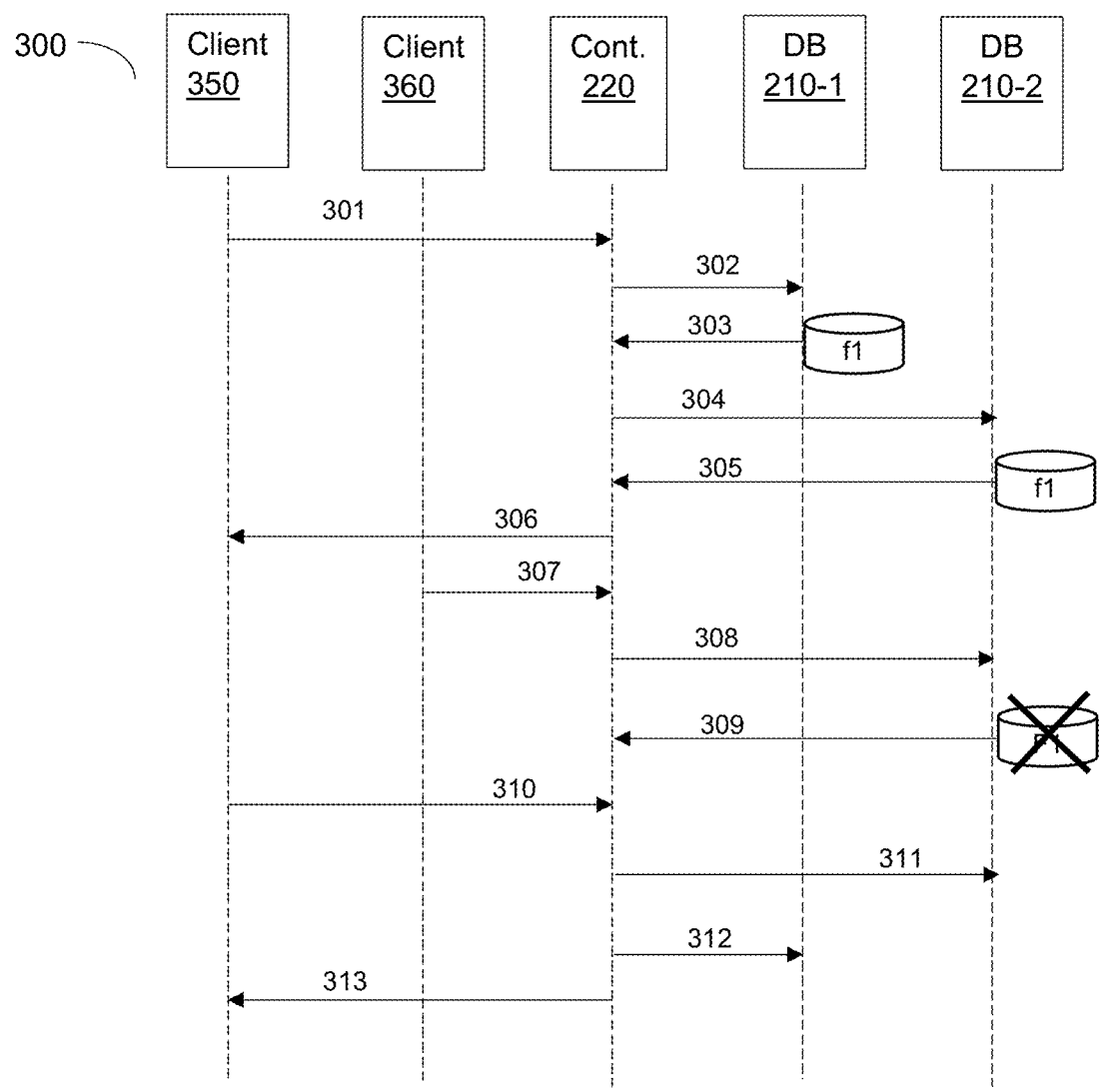
FIG. 3 is a flow diagram illustrating the process for managing locks in the locking system according to the disclosed embodiments.

FIG. 3 shows an example flow diagram 300 illustrating the process for managing locks in the locking system 120 according to the disclosed embodiments. The flow diagram 300 demonstrates two clients, 350 and 360, which may be executed by one or more servers (e.g., a server 110, FIG. 1). In this example, only two database instances are shown, 210-1 and 210-2, and the set prefix value is 3.

At 301, a client 350 requests to lock a resource file (f1).

At 302, the controller 220 is configured to compute a shard key, for example, $key_0$=function $\{3, f1\}$), where 'f1' is the lock name and '3' is the prefix value. The shared key ($key_0$) points to entries (labeled 11) in databases 210-1, 210-2, respectively. The lock request is first sent, for example, to a database 210-1.

At 303, as there is no current lock recorded in entries pointed by the $key_0$, and database instance 210-1 acknowledges that the lock can be acquired. In response, at 304, the lock request is then sent, for example, to a database 210-2. It should be noted that the lock request is sent to the second database only if the first database (210-1) acknowledges the lock. At 305, as there is no current lock recorded in entries pointed by the $key_0$, a database 210-2 acknowledges that the lock can be acquired. Then, at 306, the lock is acquired, and a message confirming the same is sent back to client 350.

At 307, a client 360 requests to lock access to the file (f1).

At 308, the controller 220 computes a shard key, for example, $key_1$=function {3, f1}), where 'f1' is the lock name, and '3' is the prefix value. The shard key, $key_1$, has the same value as the $key_0$, thus, shared key, $key_1$, also points to entries (labeled "f1") in databases 210-1, 210-2. Here, the received lock request is first sent only to the database 210-2.

At 309, as there is a lock on the file (f1) recorded in at least a database 210-2 the lock request cannot be acknowledged, thus, an abort message is returned. Then, an abort message is sent by controller 220 to client 360. As demonstrated in FIG. 3, any lock is recorded in two databases. If even one database cannot acquire the lock, an abort message is returned. Alternatively, to the abort message, a false message can be sent indicating the client 360 to try again after a specified time. It should be noted that the "abort", "false", and the like are just examples of messages that are sent when lock requests s cannot be acknowledged.

The release of the locks is performed in an opposite order of the locking sequence. Following the above example, the release request will be first sent to the database 220-2, and then to the database 220-1. This is performed in order to prevent deadlocks in the locking system 120.

As an example, at 310, a request from client 350 holding the lock on 'f1' to release the lock is received. This lock is currently maintained in databases 210-1 and 210-2. At 311, the lock request is first sent to database 210-2. When the released is confirmed by the database 210-2, at 312, the release request is sent to database 210-1. At 313, the controller 220 receives acknowledgments from the two databases 210-1 and 220-2, and thus, informs the same to the client 350.

In the diagram shown in FIG. 3, the controller 220 is shown as a component outside the clients 350, 360. However, in certain implementations an instance of the controller 220 can be implemented in both clients 350 and 360.

Figure 4:
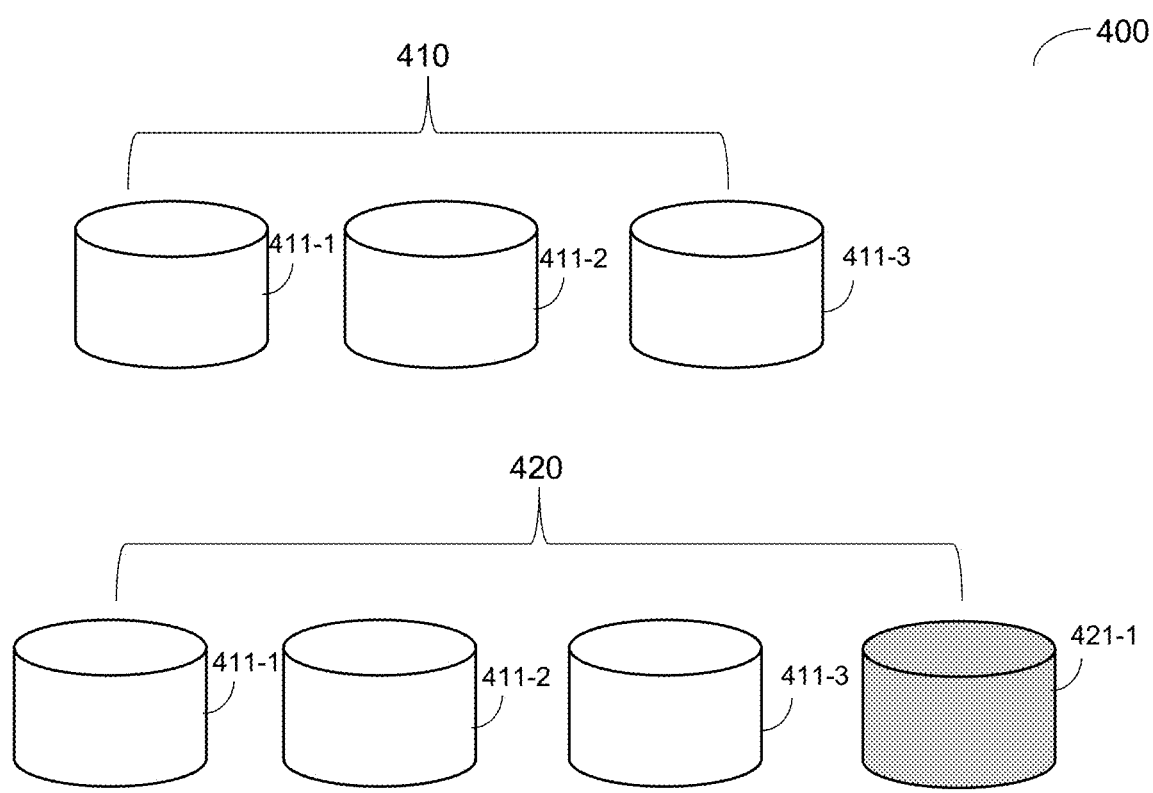
FIG. 4 is a diagram illustrating a scaling out process the locking system according to an embodiment.

FIG. 4 shows an example diagram 400 illustrating the process of scaling out in the locking system 120 according to an embodiment. The scaling-out process is when database instances are added to the locking system 120. In the example provided in FIG. 4, the locking system 120 is scaled from a set 410 including three database instances (or simply databases) 411-1, 411-2, and 411-3 to a set 420 including 4 databases 411-1, 411-2, 411-3, and 421-1. The databases 411-1, 411-2, and 411-3 are included and operable in both sets. This is required to maintain all locks stored in the original set (410) when transitioning to a new set (420).

In the example provided in FIG. 4, the set prefix values are 3 and 4, for sets 410 and 420, respectively. Initially, when only the set 410 exists (i.e., before scaling out), the shard key pointing to entries in databases 411-1, 411-2, and 411-3 is computed over the prefix value (3) of set 410 and a lock name. For example, before a scaling out event, a lock on a file (F2) is saved in the databases 411-1, 411-2, and 411-3 using a shard key $key_0$=function {3, F2}, where 'F2' is the lock name, and '3' is the prefix value.

When a new database 421-1 is added, a new set (420) is formed. Thereafter, all locks will be recorded in both sets (410 and 420) until a transition to the new set 420 is completed. For example, a new lock request on a resource F3 is received. Two shard keys are computed for this request, each using a different prefix value. That is, the shard key for the set 410 is computed as:

$key_1$=function {3, F3}; and a shard key for the set 420 is computed as:

$key_2$=function {4, F3}, where 'F3' is the lock name, and '3' and '4' are the prefix values.

The locks on a resource F3 will be recorded in, for example, databases 411-1 and 411-2 in set 410, and databases 411-3 and 421-1 in set 420. It should be noted that some databases are included in both sets. However, because the shard keys for the same lock are different, the locks will be recorded in different entities in such databases.

The transition to the new set 420 is completed when no locks are recorded in the databases with the prefix of the original set (410). This happens as locks are released over time. When the transition to the new set 420 is completed, new lock requests are registered only in the new set 420, and only one shard key is computed.

According to the disclosed embodiments, the scaling in (removing databases) is performed in a similar manner. That is, locks are recorded in a new set (with a reduced number of databases) and a current set of databases, using their respective different set of prefix values.

Figure 5:
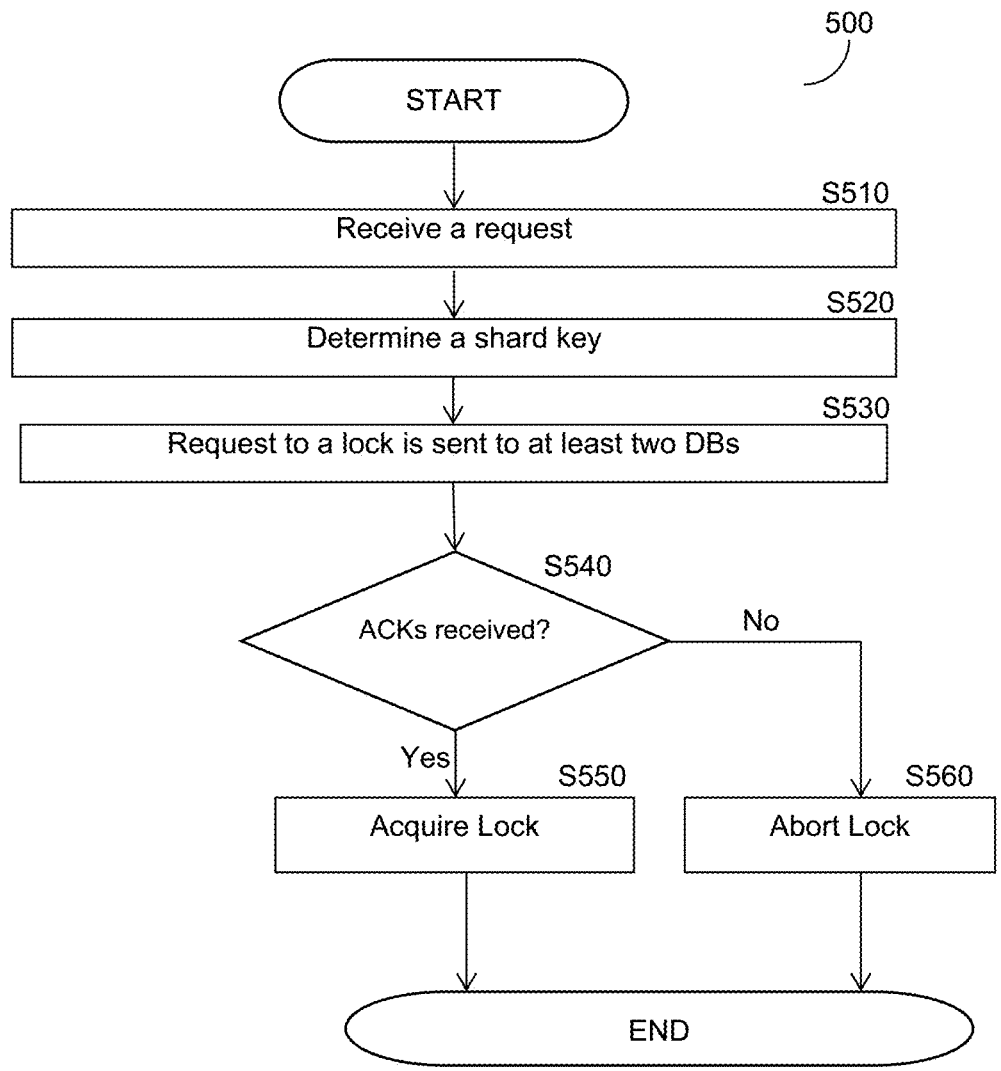
FIG. 5 is a method for executing distributed locks in the locking system according to an embodiment.

FIG. 5 is an example flowchart 500 illustrating a method for executing distributed locks in the locking system 120 according to an embodiment. The method may be performed by a controller, such as a controller 220, FIG. 2.

At S510, a lock request is received. The request is received from a process, a service, a server, and the like (collectively referred to as a client or clients) requesting a lock. The request includes at least a lock name to place a lock on. The resource is a critical section that may include a file, a process, a thread, and the like. Lock requests can be received from different clients that are geographically distributed. The request can be received through a standard API compatible with the relational databases in the locking system 120.

At S520, a shard key is determined for the received lock request. The shard key is an index or a pointer to at least two databases in the locking system. In an example embodiment, the shard key is computed using a hash function over the values of a set prefix and a lock name to be locked. The set prefix value is, in one example, a number of databases in a current set maintained by the locking system. Each such database is an instance of a relational database. It should be noted that the prefix value may be set to any unique identifier that is persistent as long as the set of databases remains the same.

At S530, a request to record the lock in an entry pointed by the shard key is sent to at least two databases in the locking system. As noted above, all databases are independent and do not share any information. In response to such a request, each database checks if a lock is already registered in an entry pointed by the shard key. If no locks are recorded in such entry, an acknowledgment message that the lock can be acquired is received. Otherwise, an abort message is received. Specifically, the requests are sequentially sent to the at least two databases. That is, the request is sent to a first database of the at least two databases, and only if the first database can acknowledge the lock, the request is sent to a second database of the at least two databases.

At S540, it is checked if each of the at least two databases returned acknowledgment messages. If so, at S550, a message that the lock can be acquired is sent back to the requesting client. Otherwise, at S560, an abort message is sent to the requesting client. The abort message indicates that the lock cannot be acquired, and the client needs to wait for the lock to be released or dismiss.

It should be noted that release is performed by checking against each of the at least two databases in a reverse order in which the locks have been acknowledged. Only when all databases confirm that the locks can be released, the client is informed that the lock has been released.

Figure 6:
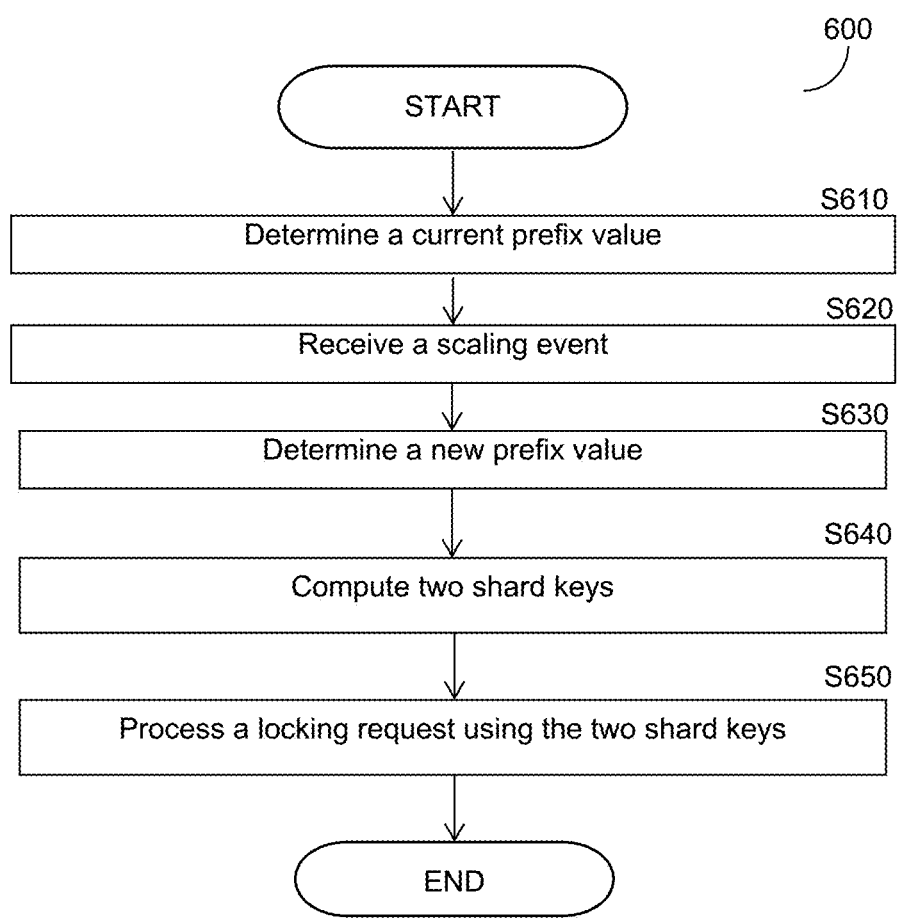
FIG. 6 is a flowchart illustrating a method for scaling the locking system according to an embodiment.

FIG. 6 is an example flowchart 600 illustrating a method for scaling the locking system 120 according to an embodiment.

At S610, a set prefix value is determined for the current set of databases in the locking system. The value will be referred to as a current prefix. In an example embodiment, the set prefix value may be the number of databases in the set. Alternatively, any unique and persistent value can be set as the current prefix.

At S620, a scaling event is received. Such an event may indicate adding or removing one or more databases from the current set of databases in the system. It should be noted that S620 may be merely an indication that the current set of databases has been scaled (out or in). In an embodiment, S620 may be performed prior to S610. In response, at S630, a set prefix value is determined for the new databases in the locking system. The value will be referred to as a new prefix. The new prefix is determined using the same notation as the current prefix.

At S640, upon receiving a locking request, two shard keys ("new key" and "current key") are computed using the new prefix value and the current prefix value, respectively. Then, at S650, the locking request is processed using the new key against the new set and the current key against the current set. That is, each request received from a client (as defined above) is submitted to the sets of databases. The lock requests are processed as discussed above with reference to FIG. 5.

Processing the lock requests against the two sets continues until no database in the current set holds a lock recorded using the current prefix. In such a case, the new prefix is set as a current prefix, and thereafter any lock requests will be processed against one of the new databases.

Figure 7:
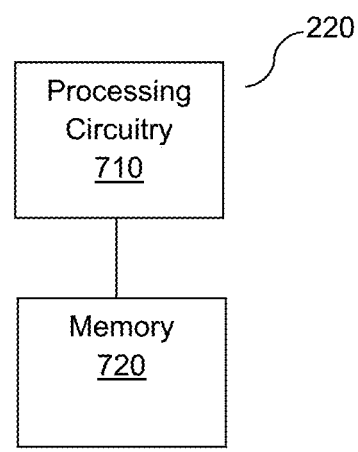
FIG. 7 is a schematic diagram of a controller according to an embodiment.

FIG. 7 is an example schematic diagram of the controller 220 according to an embodiment. The controller 220 may be realized as a processing circuitry 710 coupled to a memory 720. The processing circuitry 710 may be realized as one or more hardware logic components and circuits. For example, and without limitation, illustrative types of hardware logic components that can be used include field-programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read-only memory, flash memory, etc.), or a combination thereof. In one configuration, software for implementing one or more embodiments disclosed herein may be stored in the memory 720. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

It should be understood that the embodiments described herein are not limited to the specific architecture illustrated in FIG. 7, and other architectures may be equally used without departing from the scope of the disclosed embodiments. In certain embodiments, controller 220 is implemented or embedded in a client or any device requesting locks.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for executing distributed locks in a computing system having resources that are adapted to be accessible by a plurality of processes that are being executed in the computing system, the method being executed by a locking system that is logically independent of the processes being executed, comprising:
   receiving, by the locking system, a lock request, from one of the executing processes, including at least a lock name of a resource to place a lock on;
   determining, by the locking system, a shard key at least based on the lock name and a prefix value, wherein the locking system includes a set of database instances, wherein the prefix value is a number of database instances currently employed in the locking system, and wherein the databases share no information and operate independently of each other;
   sending the lock request to at least two database instances in the set of database instances to place the lock in an entry pointed by the shard key;
   transmitting a message to the process requesting the lock that the lock can be acquired when all of the at least two database instances acknowledge the lock request; and
   dismissing the lock request when at least one database instance of the at least two database instances cannot acknowledge the lock request.

2. The method of claim 1, wherein the sending and dismissing further comprises:
   sending the lock request to a first database instance of the at least two database instances to place the lock in the entry pointed by the shard key;
   checking that the first database instance acknowledged the lock request;
   sending the lock request to a second database instance of the at least two database instances to place the lock in the entry pointed by the shard key, when the first database instance acknowledged the lock request; and
   dismissing the lock request when the first database instance cannot acknowledge the lock request.

3. The method of claim 2, further comprising:
   receiving a release lock request to release the lock on the resource;
   sending the release lock request to the second database instance to release the lock; and
   upon receiving a confirmation that the lock was released, sending the release lock request to the first database instance to release the lock.

4. The method of claim 1, wherein the resource is any one of: a critical section in a computer program, a file system, and a storage.

5. The method of claim 1, wherein any database instance in the set of database instances is an instance of a relational database.

6. The method of claim 1, wherein the database instances in the set of database instances are distributed.

7. The method of claim 1, further comprising:
   scaling the set of database instances to include additional database instances.

8. The method of claim 7, further comprising:
   determining a current prefix value for a current set of database instances, wherein the current prefix value uniquely identifies a number of databases in the current set of database instances;
   determining a new prefix value for a new set of database instances resulted resulting from a scale operation on the current set of database instances, wherein the new set of database instances include database instances from the current set wherein the new prefix value uniquely identifies a number of databases in the new set of database instances;
   upon receiving the locking request, computing a first shard key as a function of on the current prefix value, and a second shard key as a function of the new prefix value; and
   processing the lock request using the first shard key on the current set of database instances and using the second shard key on the new set of database instances.

9. The method of claim 8, wherein the scale operation is any one of: a scaling out, in which database instances are added, and a scaling in, in which database instances are removed.

10. The method of claim 8, wherein processing the lock request further comprises:
    record a locking of a resource in at least two database instances in the current set and at least two database instances in the new set.

11. A non-transitory computer readable medium having stored thereon instructions for causing a processing circuitry to execute a method for executing distributed locks in a computing system having resources that are adapted to be accessible by a plurality of processes that are being executed in the computing system, the method being executed by a locking system that is logically independent of the processes being executed, the process comprising:
    receive, by the locking system, a lock request, from one of the executing processes, including at least a lock name of a resource to place a lock on;
    determine, by the locking system, a shard key at least based on the lock name and a prefix value, wherein the locking system includes a set of database instances, wherein the prefix value is a number of database instances currently employed in the locking system, and wherein the databases share no information and operate independently of each other;
    send the lock request to at least two database instances in the set of database instances to place the lock in an entry pointed by the shard key;
    transmit a message to the process requesting the lock that the lock can be acquired when all of the at least two database instances acknowledge the lock request; and
    dismiss the lock request when at least one database instance of the at least two database instances cannot acknowledge the lock request.

12. A controller for executing distributed locks in a computing system having resources that are adapted to be accessible by a plurality of processes that are being executed in the computing system, the locking being executed by a locking system that is logically independent of the processes being executed, the controller, comprising:
    a processing circuitry; and
    a memory, the memory containing instructions that, when executed by the processing circuitry, configure the controller to:
    receive a lock request, from one of the executing processes, including at least a lock name of a resource to place a lock on;
    determine a shard key at least based on the lock name and a prefix value, wherein the locking system includes a set of database instances, wherein the prefix value is a number of database instances currently employed in the locking system, and wherein the databases share no information and operate independently of each other;

send the lock request to at least two database instances in the set of database instances to place the lock in an entry pointed by the shard key;

transmit a message to the process requesting the lock that the lock can be acquired when all of the at least two database instances acknowledge the lock request; and dismiss the lock request when at least one database instance of the at least two database instances cannot acknowledge the lock request.

13. A method for use in a computing system having resources that are adapted to be accessible by a plurality of processes that are being executed in the computing system, the method being executed by a locking system that is logically independent of the processes being executed, the method being for scaling the locking system, the locking system includes a set of database instances, the method comprising:

determining a current prefix value for a current set of database instances, wherein a current set of database instances includes at least two of the database instances and wherein the current prefix value uniquely identifies a number of databases in the current set of database instances;

determining a new prefix value for a new set of database instances resulted from a scale operation on the current set of database instances wherein the new prefix value uniquely identifies a number of databases in the new set of database instances;

upon receiving a lock request including at least a lock name of a resource to place a lock on, computing a first shard key as a function of the current prefix value and the lock name and a second shard key based as a function of the new prefix value and the lock name; and processing the lock request using the first shard key on the current set of database instances and using the second shard key on the new set of database instances.

14. The method of claim 13, wherein the scale operation is any one of: a scaling out where database instances are added, and a scaling in where database instances are removed.

15. The method of claim 14, wherein the processing of the lock request further comprises:

locking a resource in the at least two database instances in the current set and at least two database instances in the new set.

16. The method of claim 14, wherein the new set of database instances include database instances from the current set.

17. A non-transitory computer readable medium having stored thereon instructions for causing a processing circuitry to execute a method for use in a computing system having resources that are adapted to be accessible by a plurality of processes that are being executed in the computing system, the method being executed by a locking system that is logically independent of the processes being executed, the method being for scaling the locking system, the locking system including a set of database instances, the method being for scaling the locking system, the locking system including a set of database instances, the method comprising:

determining a current prefix value for a current set of database instances, wherein a current set of database instances includes at least two of the database instances and wherein the current prefix value uniquely identifies a number of databases in the current set of database instances;

determining a new prefix value for a new set of database instances resulted from a scale operation on the current set of database instances wherein the new prefix value uniquely identifies a number of databases in the new set of database instances;

upon receiving a lock request including at least a lock name of a resource to place a lock on, computing a first shard key as a function of the current prefix value and the lock name and a second shard key based as a function of the new prefix value and the lock name; and processing the lock request using the first shard key on the current set of database instances and using the second shard key on the new set of database instances.

18. A controller for executing locks in a computing system having resources that are adapted to be accessible by a plurality of processes that are being executed in the computing system, the locking being executed by a locking system that is logically independent of the processes being executed, the controller, comprising:

a processing circuitry; and a memory, the memory containing instructions that, when executed by the processing circuitry, configure the controller to:

determine a current prefix value for a current set of database instances, wherein a current set of database instances includes at least two of the database instances and wherein the current prefix value uniquely identifies a number of databases in the current set of database instances;

determine a new prefix value for a new set of database instances resulted from a scale operation on the current set of database instances wherein the new prefix value uniquely identifies a number of databases in the new set of database instances;

upon receiving a lock request including at least a lock name of a resource to place a lock on, compute a first shard key as a function of the current prefix value and the lock name and a second shard key based as a function of the new prefix value and the lock name; and process the lock request using the first shard key on the current set of database instances and using the second shard key on the new set of database instances.

19. The controller of claim 18, wherein the scale operation is any one of: a scaling out where database instances are added, and a scaling in where database instances are removed.

20. The controller of claim 18, wherein the controller is further configured to:

record a lock of a resource in the at least two database instances in the current set and at least two database instances in the new set.

21. The controller of claim 18, wherein the new set of database instances includes database instances from the current set.

* * * * *